(12) United States Patent
Hotta

(10) Patent No.: US 11,885,388 B2
(45) Date of Patent: Jan. 30, 2024

(54) VIBRATION DAMPING DEVICE AND METHOD OF MANUFACTURING VIBRATION DAMPING DEVICE

(71) Applicant: SUMITOMO RIKO COMPANY LIMITED, Komaki (JP)

(72) Inventor: Kazuki Hotta, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 249 days.

(21) Appl. No.: 17/532,313

(22) Filed: Nov. 22, 2021

(65) Prior Publication Data
US 2022/0282762 A1 Sep. 8, 2022

(30) Foreign Application Priority Data

Mar. 5, 2021 (JP) ................. 2021-034884
Aug. 2, 2021 (JP) ................. 2021-126654

(51) Int. Cl.
*F16F 1/38* (2006.01)
*F16F 1/373* (2006.01)
*F16F 1/387* (2006.01)

(52) U.S. Cl.
CPC .......... *F16F 1/3842* (2013.01); *F16F 1/3735* (2013.01); *F16F 1/3873* (2013.01); *F16F 2226/045* (2013.01); *F16F 2230/0005* (2013.01); *F16F 2234/02* (2013.01)

(58) Field of Classification Search
CPC ....... F16F 1/3842; F16F 1/3735; F16F 1/3873
See application file for complete search history.

(56) References Cited

U.S. PATENT DOCUMENTS

2015/0113797 A1* 4/2015 Cha .......................... B60G 7/02
29/724

FOREIGN PATENT DOCUMENTS

| JP | S60-122035 U | 8/1985 |
| JP | 2007263347 A * | 10/2007 |
| JP | 2008249050 A * | 10/2008 |

* cited by examiner

*Primary Examiner* — Melanie Torres Williams
(74) *Attorney, Agent, or Firm* — Oliff PLC

(57) ABSTRACT

A vibration damping device including an inner, a tubular outer disposed on a radially outer side of the inner, an elastic body connecting the inner and the outer, and a retainer disposed on at least one axial end of the inner and penetrated by an opening in an axial direction. The inner includes an annular projection extending outward in the axial direction from at least one axial end face of the inner and inserted in the opening of the retainer. The annular projection includes a plurality of compressed fixation parts arranged apart from each other in a circumferential direction. The retainer is fixed by compression to the inner by the compressed fixation parts being compressed against an inner circumferential surface of the opening.

13 Claims, 15 Drawing Sheets

VIBRATION DAMPING DEVICE AND METHOD OF MANUFACTURING VIBRATION DAMPING DEVICE

INCORPORATED BY REFERENCE

The disclosures of Japanese Patent Application Nos. 2021-034884 filed on Mar. 5, 2021 and 2021-126654 filed on Aug. 2, 2021, each including the specification, drawings and abstract is incorporated herein by reference in its entirety.

BACKGROUND OF THE INVENTION

1. Field of the Invention

The present invention relates to a vibration damping device and a method of manufacturing the vibration damping device.

2. Description of the Related Art

Conventionally, as a vibration damping device, there is known a bushing assembly including an outer tube, an inner tube, a main rubber linking the inner circumferential surface of the outer tube and the outer circumferential surface of the inner tube, and retainers arranged at opposite axial ends of the inner tube, in which the retainers have a compression part fixed at the end of the inner tube. For example, Japanese Unexamined Utility Model Publication No. JP-U-S60-122035 describes such a bushing assembly.

SUMMARY OF THE INVENTION

Meanwhile, in the bushing assembly of JP-U-S60-122035, in order to fix the retainer to the end of the inner tube, a compression-fixing structure using a compression jig is adopted. Specifically, a tubular compression part provided to the axial end of the inner tube is inserted in an opening that penetrates the retainer. The compression part, which is expanded by the compression jig being press-fitted into the radial inside of the compression part, is fixed by compression to the inner circumferential surface of the retainer. However, during such compression fixing, the inner circumferential surface of the inner tube (the compression part) is scraped by the compression jig, and burrs are generated on the inner circumferential surface of the inner tube. This may entail problems in assembly accuracy and cost increase, namely, an assembly defect, a time-consuming deburring work, and the like.

It is therefore one object of this invention to provide a vibration damping device and a method for manufacturing such a device which are able to suppress generation of burrs as well as to obviate or simplify the deburring work with a simpler structure.

In order to achieve the above object, a first preferred embodiment of the present invention provides a vibration damping device comprising: an inner; an outer having a tubular shape and disposed on a radially outer side of the inner; an elastic body connecting the inner and the outer; and a retainer disposed on at least one axial end of the inner and penetrated by an opening in an axial direction, wherein the inner includes an annular projection extending outward in the axial direction from at least one axial end face of the inner and inserted in the opening of the retainer, the annular projection includes a plurality of compressed fixation parts arranged apart from each other in a circumferential direction, and the retainer is fixed to the inner with the plurality of compressed fixation parts being compressed against an inner circumferential surface of the opening of the retainer.

According to the first preferred embodiment, the annular projection of the inner includes the compressed fixation parts arranged apart from each other in the circumferential direction. Thus, when the compressed fixation part of the inner is compressed against the inner circumferential surface of the retainer and fixed thereto by compression, in comparison with the case where the compressed fixation part is fixed by compression over the entire circumference, the burrs to be generated in the inner circumferential surface of the inner (the annular projection) will be suppressed. This makes it possible to easily remove the burrs or to obviate the deburring work.

A second preferred embodiment provides the vibration damping device according to the first preferred embodiment, wherein the annular projection includes a plurality of connecting parts that are circumferentially interposed between adjacent ones of the compressed fixation parts and connect the adjacent ones of the compressed fixation parts in the circumferential direction, and the retainer is fixed to the inner with a gap formed between each connecting part and the inner circumferential surface of the opening.

According to the second preferred embodiment, the connecting parts are circumferentially provided between the adjacent ones of the compressed fixation parts with a gap formed between each connecting part and the retainer. Thus, when the compressed fixation part is compressed against the inner circumferential surface of the opening of the retainer and fixed thereto by compression, deformation of the compressed fixation part in the circumferential direction is allowed by the said gap. Therefore, when the compressed fixation part is pushed to expand to the outer periphery and fixed by compression, the burrs are less prone to be generated in the inner circumferential surface of the compressed fixation part.

A third preferred embodiment provides the vibration damping device according to the first or second preferred embodiment, wherein the annular projection includes a plurality of connecting parts that are circumferentially interposed between adjacent ones of the compressed fixation parts and connect the adjacent ones of the compressed fixation parts in the circumferential direction, and the retainer is fixed to the inner with the connecting parts being in contact with the inner circumferential surface of the opening.

According to the third preferred embodiment, the connecting parts are in contact with the inner circumferential surface of the retainer. This makes it possible to, for example, exert an auxiliary fixing force between the connecting parts and the retainer, thereby improving the fixing strength of the inner and the retainer. Besides, entry of debris such as water through the gap between the connecting parts and the retainer can also be prevented.

A fourth preferred embodiment provides the vibration damping device according to the second or third preferred embodiment, wherein a radial thickness of each connecting part is larger than that of each compressed fixation part.

According to the fourth preferred embodiment, if the connecting part is thicker in the radial direction than the compressed fixation part in the state where the inner and the retainer are fixed by compression, extensional deformation (movement of the forming material) in the circumferential direction from the compressed fixation part to the connecting part has occurred during the compression fixing. This will suppress the generation of burrs due to excessive compression of the compressed fixation part between the compression jig and the retainer.

A fifth preferred embodiment provides the vibration damping device according to any one of the second through fourth preferred embodiments, wherein a circumferential length of each compressed fixation part is larger than that of each connecting part.

According to the fifth preferred embodiment, the circumferential length of the area where the inner and the retainer fixed by compression by the compressed fixation part increases, thereby improving the fixing strength of the inner and the retainer. Besides, the inner and the retainer are fixed by compression over a wide range in the circumferential direction, so that relative tilt, misalignment and the like between the inner and the retainer in the fixed state are less prone to occur, thereby achieving stable assembly of the inner and the retainer.

A sixth preferred embodiment provides the vibration damping device according to any one of the first through fifth preferred embodiments, wherein a material hardness of the inner is smaller than that of the retainer.

According to the sixth preferred embodiment, even if the material hardness of the inner in which burrs are likely to be generated is smaller than that of the retainer, by the inner and the retainer being fixed by compression by the compressed fixation parts that are arranged apart from each other in the circumferential direction, the inner and the retainer can be effectively fixed while suppressing the generation of burrs in the inner due to a large deformation of the inner whose material hardness is smaller.

A seventh preferred embodiment provides the vibration damping device according to any one of the first through sixth preferred embodiments, wherein the compressed fixation parts are arranged at regular intervals in the circumferential direction.

According to the seventh preferred embodiment, the fixing force due to the compressed fixation parts acts in a balanced manner in the circumferential direction, thereby stably fixing the inner and the retainer. Besides, it is possible to prevent the annular projection from becoming distorted after the compression fixing.

An eighth preferred embodiment provides the vibration damping device according to any one of the first through seventh preferred embodiments, wherein the at least one axial end face of the inner is abutted on an opening peripheral edge of the opening of the retainer, while the annular projection projecting from the axial end face of the inner is inserted in the opening of the retainer, and the inner circumferential surface of the opening of the retainer includes a stepped part projecting radially inward partially on a side on which the inner is abutted, and the compressed fixation parts of the annular projection are locked with respect to the stepped part in the axial direction.

According to the eighth preferred embodiment, the compressed fixation parts of the inner are locked with respect to the stepped part of the retainer in the axial direction. This will greatly exhibit resistance to dislodgment of the annular projection from the opening of the retainer, thereby preventing the inner and the retainer from becoming separated in the axial direction. Moreover, the stepped part is partially provided to the inner circumferential surface of the opening of the retainer on the side on which the inner is abutted. This makes it possible to lock the compressed fixation parts to the stepped part without the compressed fixation parts considerably projecting from the opening of the retainer. For example, the compressed fixation parts can also be locked to the stepped part while being accommodated in the radial inside of the opening of the retainer.

A ninth preferred embodiment provides the vibration damping device according to the eighth preferred embodiment, wherein the annular projection includes a plurality of connecting parts that are circumferentially interposed between adjacent ones of the compressed fixation parts and connect the adjacent ones of the compressed fixation parts in the circumferential direction, and the connecting parts are in contact with the inner circumferential surface of the opening at the stepped part of the retainer, while being remote from the inner circumferential surface of the opening with a gap in between at a portion away from the stepped part of the retainer.

According to the ninth preferred embodiment, the connecting parts are in contact with the stepped part, thereby obtaining an auxiliary fixing force between the inner and the retainer due to the connecting part. Besides, the connecting parts are remote from the inner circumferential surface of the opening with a gap in between at the portion away from the stepped part. Thus, during the compression fixing of the inner and the retainer, the generation of burrs in the compressed fixation part will be suppressed by the connecting parts.

A tenth preferred embodiment of the present invention provides a method of manufacturing a vibration damping device that comprises an inner including an annular projection extending outward in an axial direction from at least one axial end face of the inner, an outer having a tubular shape and disposed on a radially outer side of the inner, an elastic body connecting an inner circumferential surface of the outer and an outer circumferential surface of the inner, and a retainer disposed on at least one axial end of the inner and penetrated by an opening in the axial direction, the method comprising: a connection step of forming the elastic body such that the inner and the outer are connected by the elastic body; an insertion step of inserting the annular projection of the inner into the opening of the retainer; and a compression step of using a compression jig having an outer circumferential surface of tubular shape, the outer circumferential surface including a plurality of expanded parts that are expanded in a radial direction and arranged apart from each other in a circumferential direction, and inserting the compression jig into a radial inside of the annular projection of the inner such that portions of the annular projection at which the respective expanded parts of the compression jig are placed are compressed against an inner circumferential surface of the opening of the retainer to provide a plurality of compressed fixation parts arranged apart from each other in a circumferential direction of the annular projection and to fix the retainer to the inner.

An eleventh preferred embodiment of the present invention provides a method of manufacturing a vibration damping device that comprises an inner including an annular projection extending outward in an axial direction from at least one axial end face of the inner, an outer having a tubular shape and disposed on a radially outer side of the inner, an elastic body connecting an inner circumferential surface of the outer and an outer circumferential surface of the inner, and a retainer disposed on at least one axial end of the inner and penetrated by an opening in the axial direction, the method comprising a compression step of using a compression jig having an outer circumferential surface of tubular shape, the outer circumferential surface including a plurality of expanded parts that are expanded in a radial direction and arranged apart from each other in a circumferential direction, and inserting the compression jig into a radial inside of the annular projection of the inner inserted in the opening of the retainer such that portions of the annular projection at which the respective expanded parts of the compression jig are placed are compressed against an inner circumferential surface of the opening of the retainer to provide a plurality of compressed fixation parts arranged apart from each other in a circumferential direction of the annular projection and to fix the retainer to the inner.

According to the tenth or eleventh preferred embodiment, by inserting the compression jig into the annular projection of the inner, the annular projection is expanded to the outer periphery at the several locations in the circumferential direction by the expanded parts of the compression jig so as to form the compressed fixation parts, whereby the inner and the retainer can be fixed by compression by the compressed fixation parts. In this way, by means of a simple operation of inserting the compression jig provided with the expanded parts into the annular projection of the inner, it is possible to form the plurality of compressed fixation parts at the same time, and to fix the inner and the retainer by the compressed fixation parts while suppressing the generation of burrs.

A twelfth preferred embodiment provides the method of manufacturing a vibration damping device according to the tenth or eleventh preferred embodiment, wherein the compression jig includes the expanded parts and a plurality of curving face connecting parts that are circumferentially interposed between adjacent ones of the expanded parts and connect the adjacent ones of the expanded parts in the circumferential direction while being each formed in a shape of curving face that is convex to a radially inner side at a cross section in an axis-perpendicular direction in a portion that forms the compressed fixation parts.

According to the twelfth preferred embodiment, when inserting the compression jig into the annular projection, in the circumferential portions of the annular projection at which the respective expanded parts of the compression jig are located, the compressed fixation parts are formed. Meanwhile, in the circumferential portions of the annular projection at which the respective curving face connecting parts are located, the annular projection is not so expanded to the outer periphery as the compressed fixation parts are, and allows the compressed fixation parts, which are radially compressed between the retainer and the expanded parts, to escape to the circumferentially opposite sides. By so doing, in the compressed fixation parts, the generation of burrs due to press-fitting of the expanded parts of the compression jig can be suppressed.

With the vibration damping device according to the present invention, by providing a plurality of compressed fixation parts, the generation of burrs can be suppressed, and the deburring work can be obviated or simplified.

According to the method for manufacturing a vibration damping device of the present invention, by using a compression jig of round tubular shape including a plurality of expanded parts that are expanded in the radial direction and arranged in the circumferential direction, a plurality of compressed fixation parts are formed by the expanded parts. By so doing, the generation of burrs can be suppressed, and the deburring work can be obviated or simplified.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Hereinafter, practical embodiments of the present invention will be described with reference to the drawings. First, the structure of the vibration damping device which is the target of the present invention will be described. In the description hereinbelow, the vertical direction and the axial direction refer to the vertical direction in FIG. 1.

A vibration damping device 1 according to a first practical embodiment is configured to be attached, for example, between a vibration source (not shown) and a vehicle body frame (vehicle body) provided in an automobile.

Figure 1:
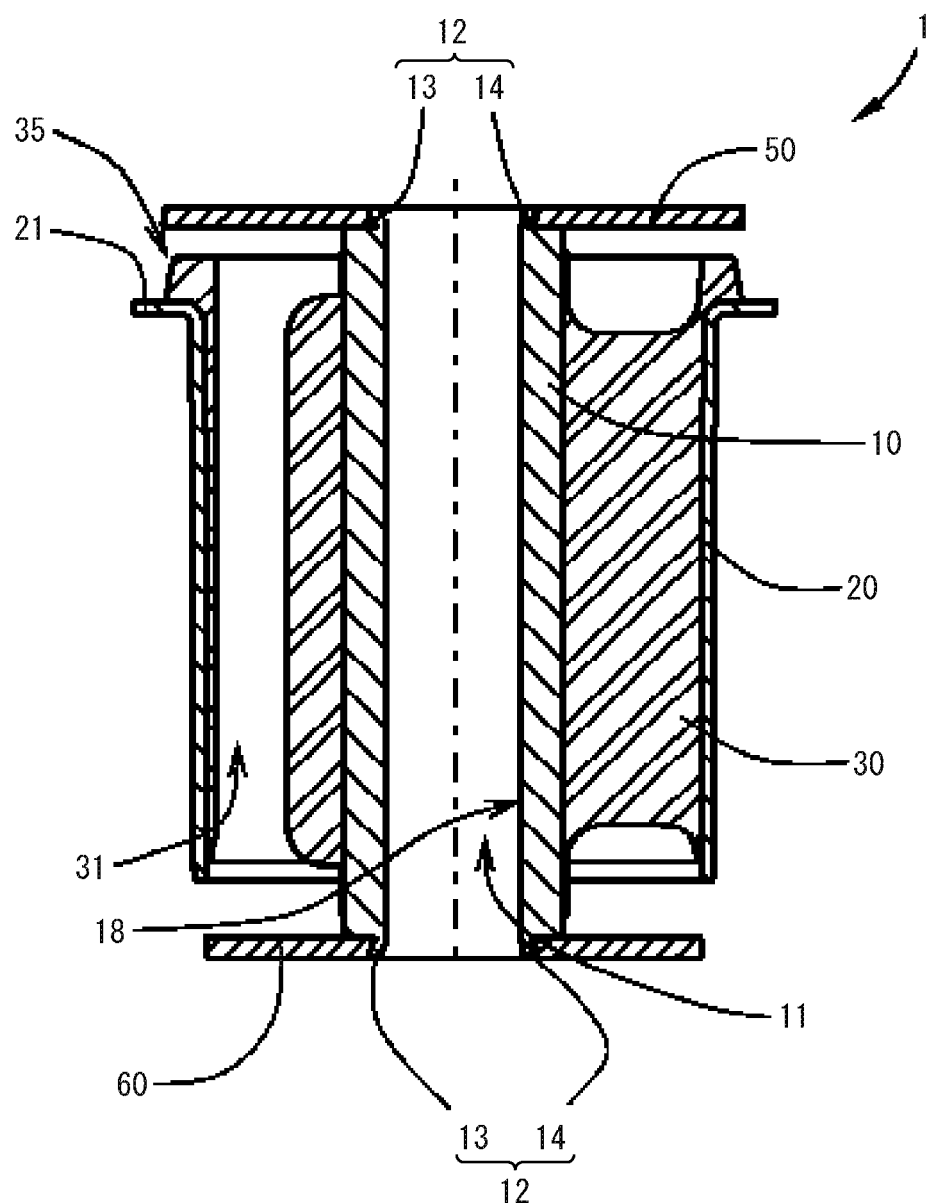
FIG. 1 is a vertical cross-sectional view showing a vibration damping device according to a first practical embodiment of the present invention, taken along line 1-1 of FIG. 2.

FIG. 1 is a cross-sectional view schematically showing an example of the vibration damping device 1 according to the present practical embodiment. As shown in FIG. 1, the vibration damping device 1 includes an inner 10 of round tubular shape, an outer 20 of round tubular shape disposed concentrically with the inner 10 and disposed on the radially outer side of the inner 10, an elastic body 30 arranged between the inner 10 and the outer 20, and a retainer 50 and a retainer 60 that are fixed by compression to the axial ends of the inner 10. In the present practical embodiment, the elastic body 30 is made of rubber, and is fixed by vulcanization bonding to the inner 10 and the outer 20.

Besides, the retainer 50 and the retainer 60 are fixed by compression to the opposite axial ends of the inner 10. In the present practical embodiment, the retainer 50 and the retainer 60 are fixed by compression to the opposite axial ends, but the retainer may alternatively be fixed by compression only to one end.

Figure 2:
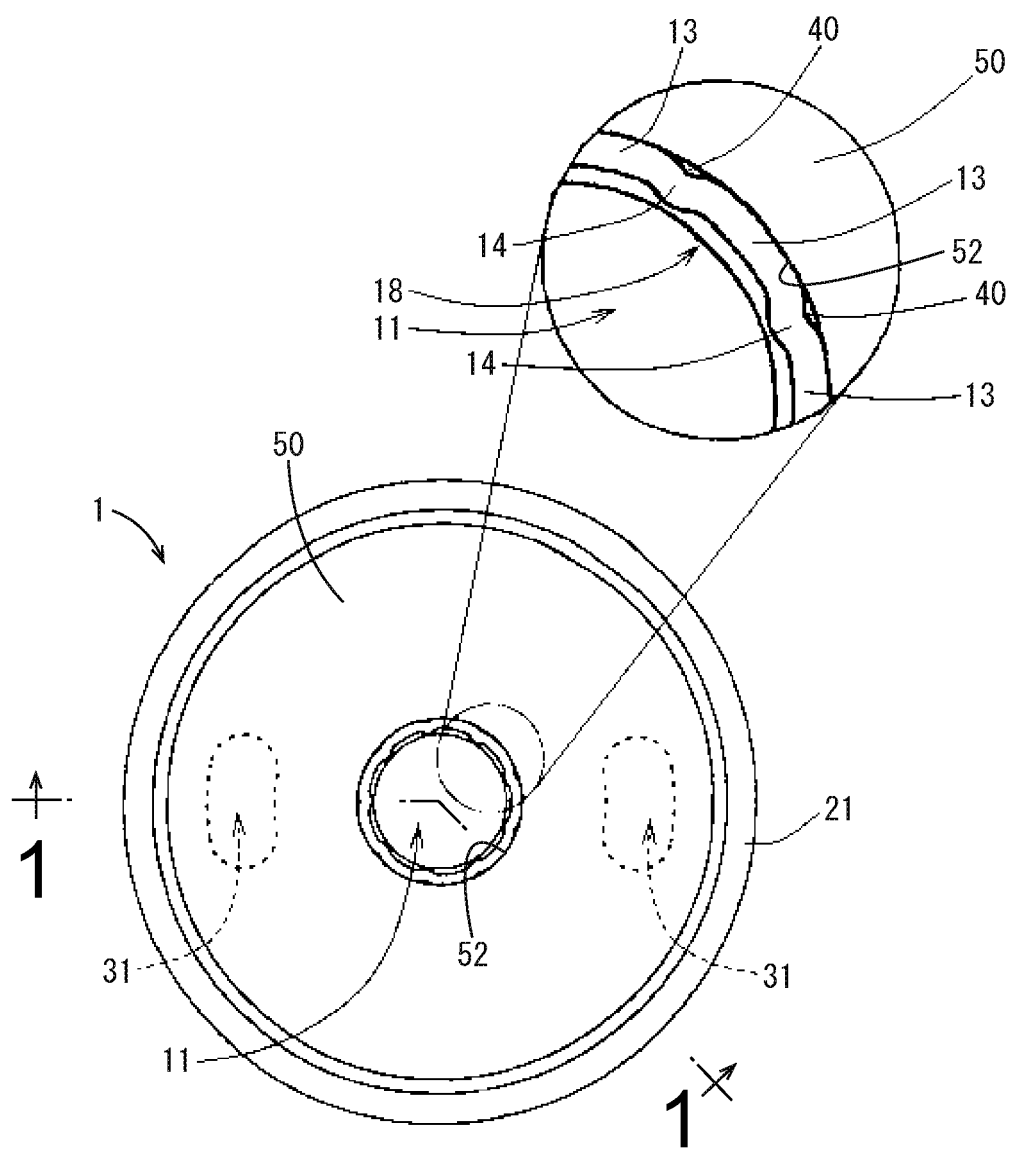
FIG. 2 is a top plan view of the vibration damping device shown in FIG. 1.
Figure 3:
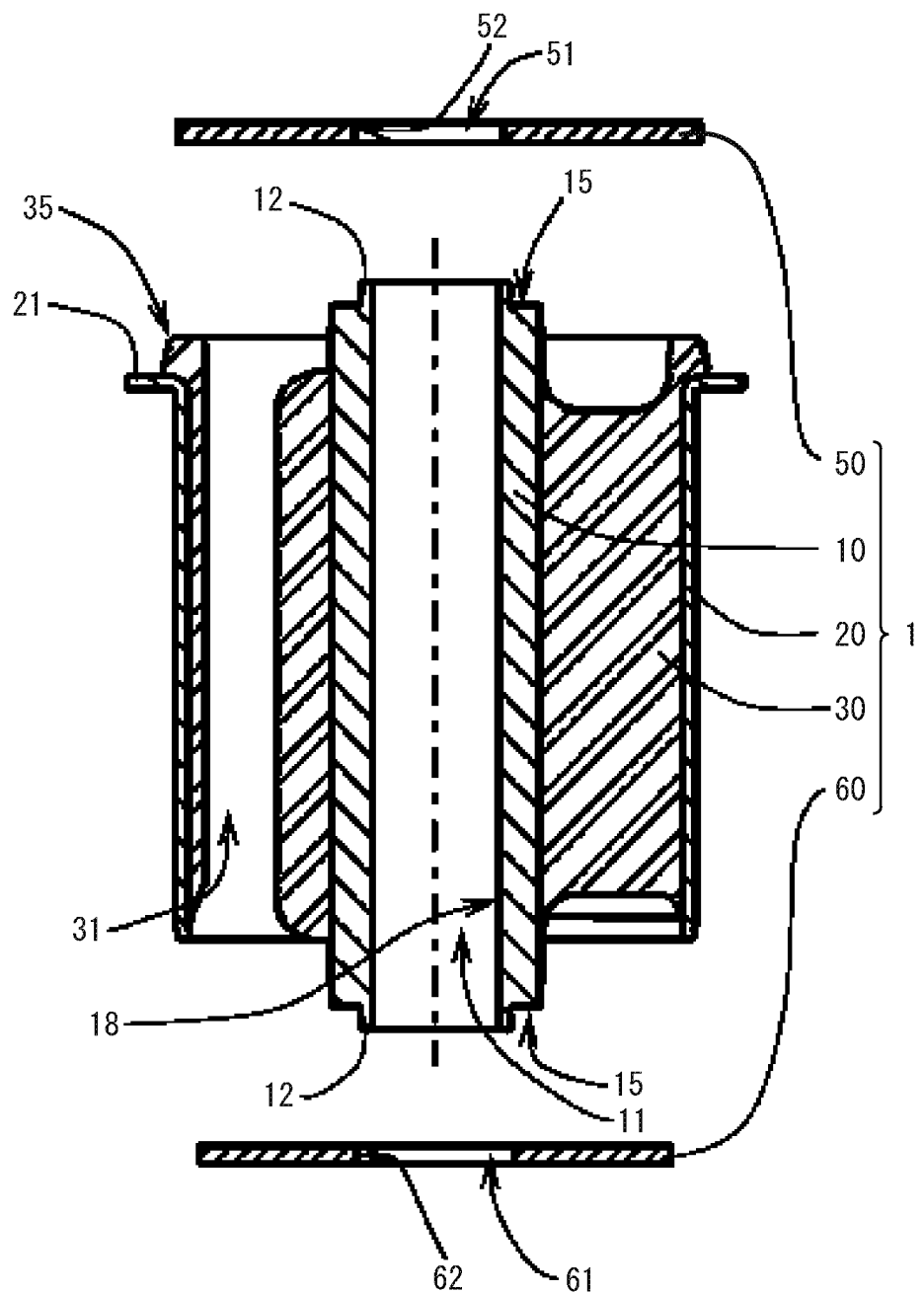
FIG. 3 shows a state before compression an inner and retainers in the cross-sectional view taken along line 1-1 of FIG. 2.
Figure 4:
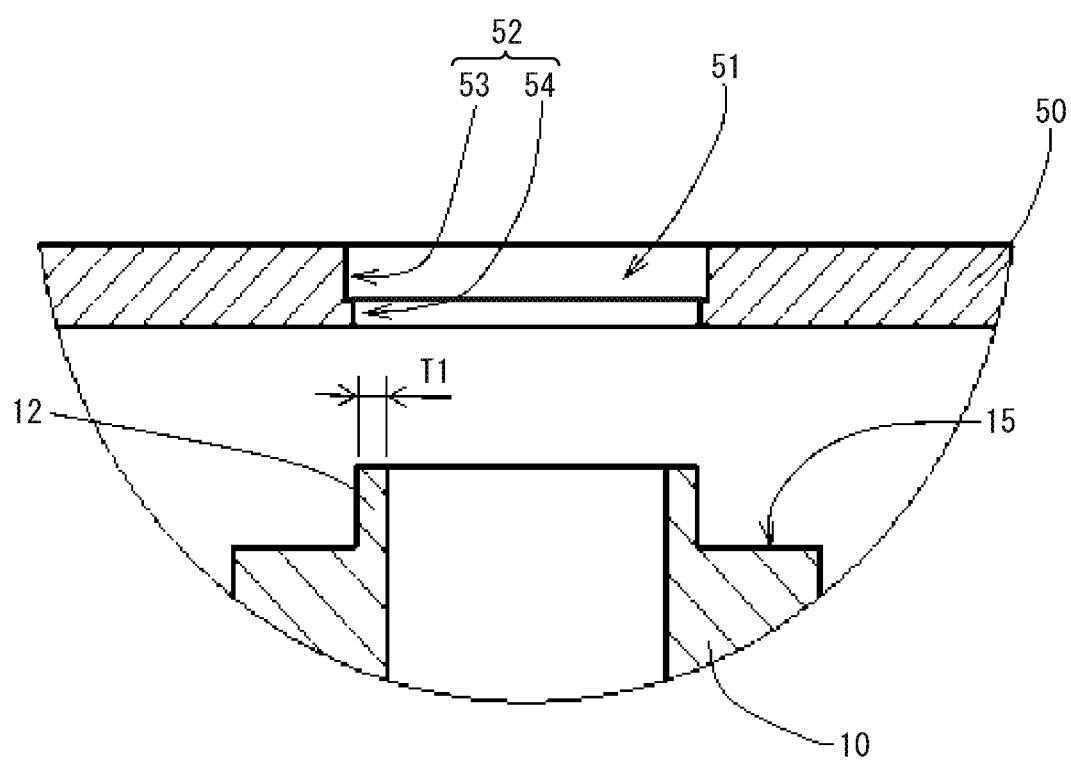
FIG. 4 is an enlarged cross-sectional view suitable for explaining a state before assembling the inner and the retainers in the vibration damping device shown in FIG. 1.
Figure 5:
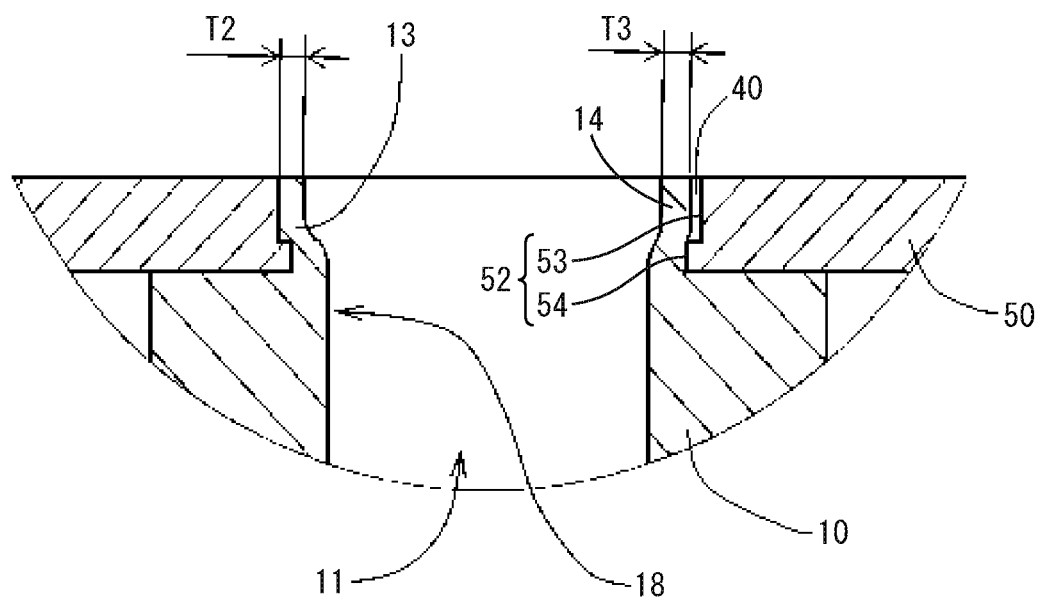
FIG. 5 is an enlarged cross-sectional view suitable for explaining a state in which the retainer is attached to the inner in the vibration damping device shown in FIG. 1.

The inner 10 comprises a cylindrical body having a through hole 11 formed in the central portion as shown in FIGS. 1, 2, 3, 4, 5, 6, 7, 8, and 9. As shown in FIGS. 3 and 4, the inner 10 includes annular projections 12, 12 extending outward in the axial direction from its opposite axial end faces 15, 15. As shown in FIGS. 1, 2, and 5, the annular projection 12 includes compressed fixation parts 13 and connecting parts 14.

As shown in FIGS. 1 and 3, the outer 20 comprises a cylindrical body thinner than the inner 10, and includes a flange part 21 extending radially outward at one axial end. The flange part 21 of the outer 20 is provided with an annular stopper 35 in the axial direction.

As shown in FIGS. 1 and 3, the elastic body 30 is bonded by vulcanization to the outer circumferential surface of the inner 10 and the inner circumferential surface of the outer 20, and includes a bore 31 extending in the axial direction.

Figure 6:
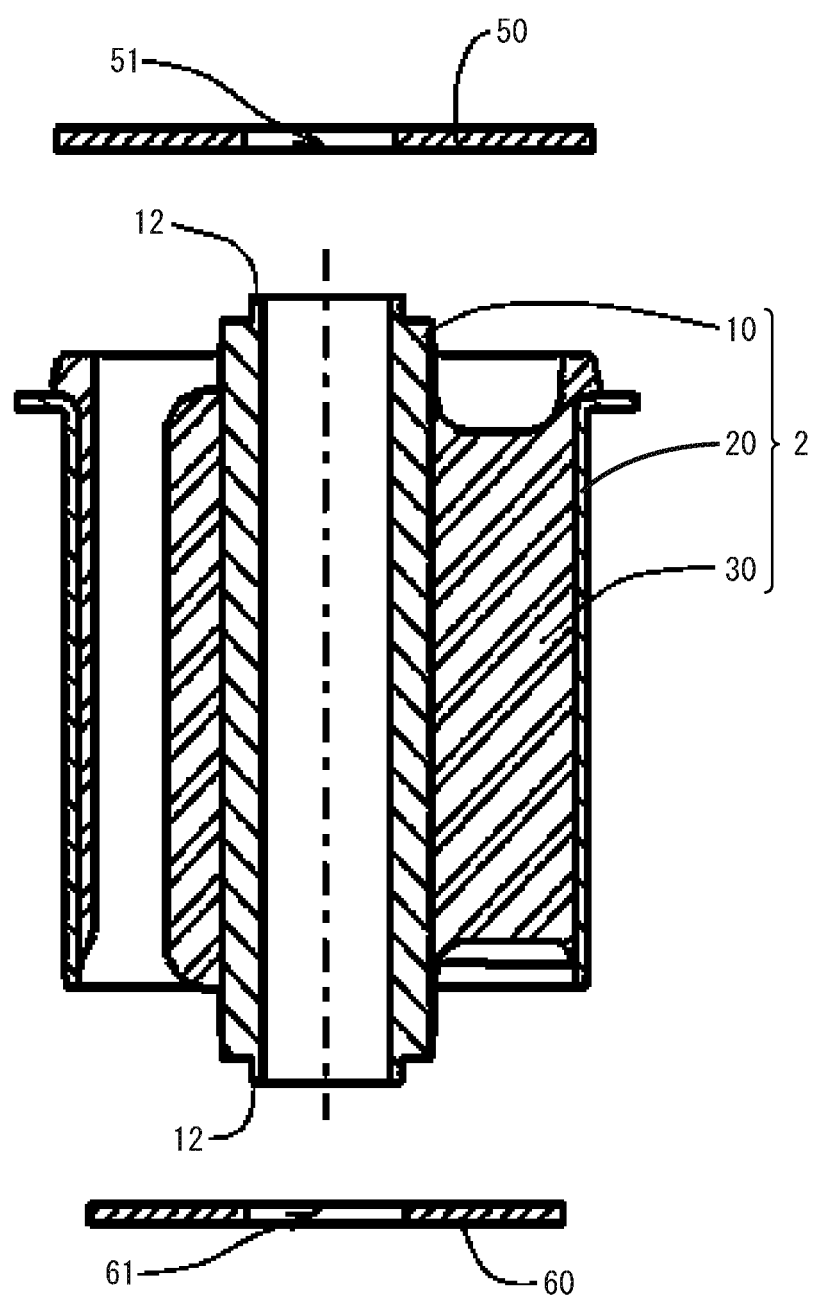
FIG. 6 is a cross-sectional view suitable for explaining a connection step before subjecting the vibration damping device shown in FIG. 1 to a compression fixing.

The retainer 50 is constituted by a circular plate, and has an opening 51 of circular shape penetrating its center portion in the axial direction as shown in FIGS. 3, 4, and 6. An inner circumferential surface 52 of the opening 51 includes a straight part 53 and a stepped part 54. The stepped part 54 projects radially inward from the inner circumferential surface 52 of the opening 51, and is provided partially on the inner 10 side in the plate thickness direction (the axial direction) of the retainer 50. The upper end of the stepped part 54 may have a corner, or may be a convex curved surface inclined radially outward toward the upper side. The stepped part 54 is provided at a lower end of the retainer 50 on which the inner 10 is abutted in the present practical embodiment, but may be provided in, for example, the axially middle portion of the retainer 50, and it is acceptable as long as the stepped part 54 is positioned on the lower side, namely, the side on which the inner 10 is abutted, with respect to the end face (the upper face) opposite to the end face (the lower face) on the side on which the inner 10 is abutted. In the present practical embodiment, the retainer 50 is a circular plate, but a rectangular, elliptical, or polygonal plate may also be adopted. The axial end face 15 of the inner 10 is abutted on an opening peripheral edge of the opening 51 of the retainer 50, and the retainer 50 is fixed to the axial end of the inner 10 and extends in the axis-perpendicular direction. The retainer 50 is opposed to the flange part 21 of the outer 20 in the axial direction, and the amount of relative displacement in the axial direction between the inner 10 and the outer 20 is limited by the retainer 50 and the flange part 21 of the outer 20 being abutted via the annular stopper 35. Besides, the upper annular projection 12 projecting from the axial end face 15 of the inner 10 is inserted in the opening 51 of the retainer 50.

The retainer 60 is constituted by a circular plate, and has an opening 61 of circular shape penetrating its center portion in the axial direction as shown in FIGS. 3 and 6. An inner circumferential surface 62 of the opening 61 includes a straight part and a stepped part (not shown) which are the same as those of the retainer 50. The similar stepped part is provided on the inner 10 side in the plate thickness direction (the axial direction) of the retainer 60. The retainer 60 has the same structure as that of the retainer 50 except for the difference in the outer diameter of the circular plate. In the description of the present practical embodiment, the retainer 60 is a circular plate, but a rectangular, elliptical, or polygonal plate may also be adopted. The retainer 60 is fixed to the axial end of the inner 10 and extends in the axis-perpendicular direction, so as to be opposed to, for example, a stopper member (not shown) provided to the outer 20 side in the axial direction. The amount of relative displacement in the axial direction between the inner 10 and the outer 20 is limited by the retainer 60 and the stopper member being abutted on each other. Since the retainer 50 and the retainer 60 have the same structures except for the outer diameter, the assembly and fixing of the retainer 50 will be described in detail. Note that the retainer 50 and the retainer 60 may have different shapes, thicknesses, and the like from each other, for example.

FIG. 2 is a view suitable for explaining the annular projection 12 of the vibration damping device 1. The annular projection 12 of the inner 10 includes a plurality of compressed fixation parts 13 arranged apart from each other in the circumferential direction, and includes a plurality of connecting parts 14 that are circumferentially interposed between adjacent ones of the compressed fixation parts 13 and connect the adjacent ones of the compressed fixation parts 13 in the circumferential direction. The compressed fixation part 13 has a circumferential length larger than that of the connecting part 14, and has a circumferential length which is, for example, not smaller than three times that of the connecting part 14. While the arrangement mode of the compressed fixation parts 13 is not limited in particular, in the present practical embodiment, the compressed fixation parts 13 are arranged at regular intervals in the circumferential direction. Here, being arranged at regular intervals in the circumferential direction means being arranged in a balanced manner in the circumferential direction overall. For example, even in the case where various types of compressed fixation parts 13 having mutually different circumferential lengths are provided, they can be arranged at regular intervals overall. As shown in FIG. 5, the compressed fixation parts 13, which are arranged at regular intervals in the circumferential direction, are compressed against the inner circumferential surface 52 of the opening 51 of the retainer 50 and fixed thereto, so that the retainer 50 is fixed by compression to the inner 10. Besides, with the retainer 50 and the inner 10 fixed by compression, as shown in FIGS. 2 and 5, a gap 40 is formed between each connecting part 14 and the straight part 53 of the inner circumferential surface 52 of the retainer 50. The annular projection 12 including the compressed fixation parts 13 and the connecting parts 14 may be expanded over the entire circumference inclusive of the connecting parts 14 by the compression fixing, not only at the compressed fixation parts 13. Besides, regarding the annular projection 12, after the compression fixing, the connecting parts 14 may have a diameter (an inside diameter and/or an outside diameter) that is generally identical with that in the initial shape.

In this way, the compressed fixation parts 13 are arranged in the circumferential direction and the connecting parts 14 that connect the compressed fixation parts 13 are provided circumferentially between the compressed fixation parts 13, 13. With this configuration, when each compressed fixation part 13 is compressed in the radial direction to be thinner due to input during compression, the compressed fixation part 13 attempts to extend to the circumferentially outer side based on a Poisson ratio. By so doing, a circumferential compression force acts on the connecting part 14 adjacent to the compressed fixation part 13 in the circumferential direction, and the connecting part 14 swells to the radially outer side based on a Poisson ratio, where the gap 40 exists. Therefore, as shown in FIG. 5, the radial thickness T3 of the connecting part 14 becomes larger than the radial thickness T2 of the compressed fixation part 13. Specifically, the stress generated in the compressed fixation parts 13 at the time of compression is dispersed in the connecting parts 14 to deform the connecting parts 14, so that the formation of burrs (surpluses) generated on the inner circumferential surface 18 is suppressed. In other words, the burrs (surpluses) flow to the connecting parts 14 that are not compressed, and the thickness corresponding to the amount of generated burrs increases, resulting in decrease or prevention of the generation of burrs on the inner circumferential surface. Thus, the deburring work can be obviated or simplified.

Since the compressed fixation part 13 compressed against the inner circumferential surface 52 of the opening 51 of the retainer 50 is arranged at regular intervals in the circumferential direction, the fixing force of the inner 10 and the retainer 50 acts in a balanced manner in the circumferential direction, thereby fixing stably. Besides, since the compressed fixation part 13 has a circumferential length larger than that of the connecting part 14, the contact area of the compressed fixation part 13 to the retainer 50 is greatly obtained, so that the fixing force of the inner 10 and the retainer 50 due to the compressed fixation part 13 can be largely attained.

FIGS. 3 and 4 are views suitable for explaining the state before the inner 10 and the retainer 50 are fixed by compression. Before compression fixing, the annular projection 12 has a round tubular shape having generally constant inside diameter and outside diameter over the entire circumference. The annular projection 12 is not provided with the compressed fixation parts 13 or the connecting parts 14, and the inner circumferential surface of the annular projection 12 is a round tubular surface located on the extension of the inner circumferential surface 18 of the inner 10. One annular projection 12 of the inner 10 is inserted into the opening 51 of the retainer 50. Besides, the other annular projection 12 of the inner 10 is inserted into the opening 61 of the retainer 60.

Figure 7:
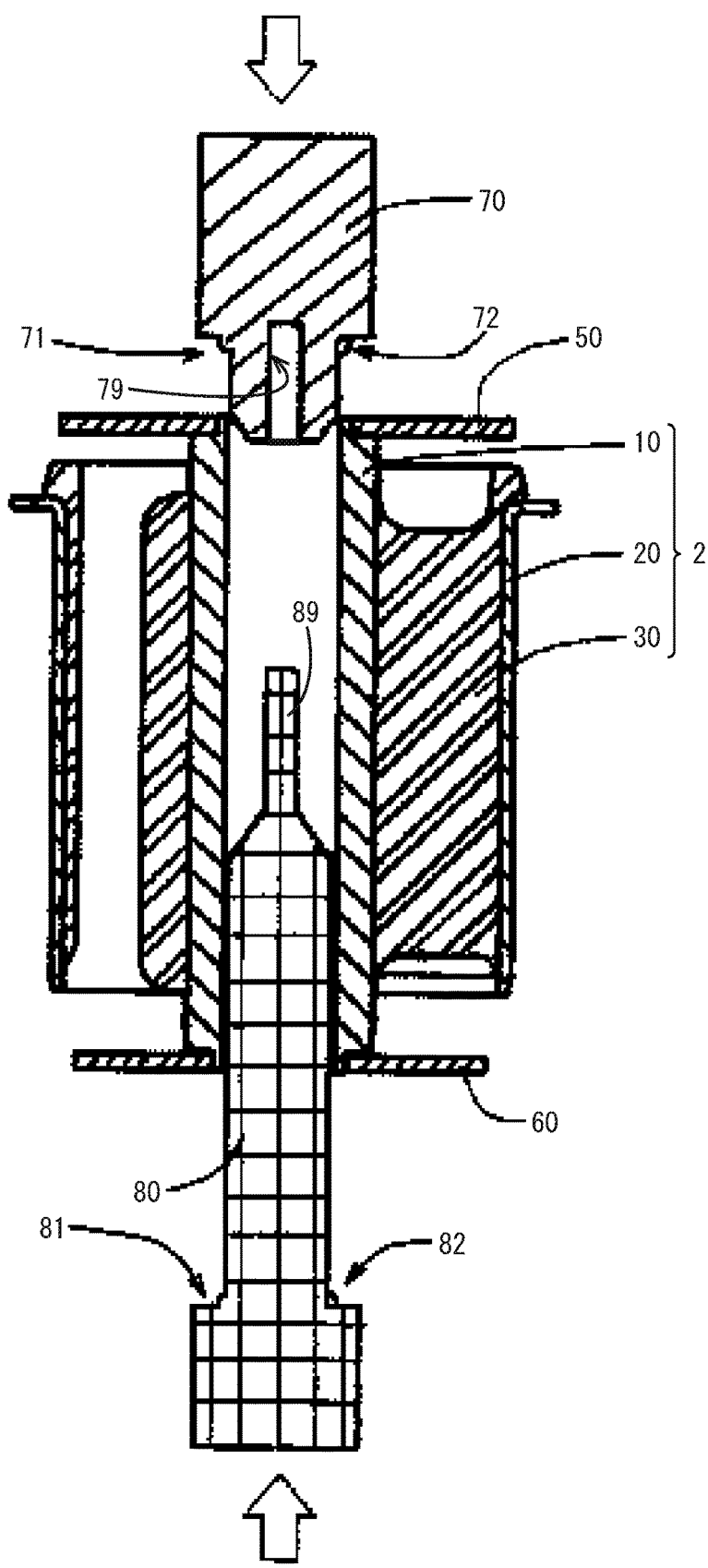
FIG. 7 is a cross-sectional view suitable for explaining an insertion step before subjecting the vibration damping device shown in FIG. 1 to the compression fixing.

FIG. 5 is a view suitable for explaining the state in which the inner 10 and the retainer 50 are fixed. The annular projection 12, which is formed on the axial end face 15 of the inner 10 and extends outward in the axial direction, is inserted into the opening 51 of the retainer 50, and is fixed by compression with such a compression jig as shown in FIG. 7 or the like described later.

After the compression fixing, the annular projection 12 comprises the plurality of compressed fixation parts 13 arranged in the circumferential direction and the plurality of connecting parts 14 that connect the compressed fixation parts 13. The compressed fixation parts 13 are formed by the annular projection 12 being partially deformed radially outward by a compression jig described later, and are compressed against the straight part 53 constituting the inner circumferential surface 52 of the retainer 50.

With such a structure, the annular projection 12, which is formed on the axial end face 15 of the inner 10 and extends outward in the axial direction, and the retainer 50 are firmly fixed at the compressed fixation parts 13. Moreover, the stepped part 54 is caught by the compressed fixation parts 13 compressed against the straight part 53 and is in an engaged state, so that the retainer 50 is less prone to be dislodged, and is more firmly fixed. In the present practical embodiment, even after the compression fixing, the axially distal end of the annular projection 12 is positioned inside the opening 51 of the retainer 50, and is prevented from projecting from the outer surface of the retainer 50 outward in the axial direction. In such an embodiment as well, the compressed fixation part 13 of the annular projection 12 has such a shape as to be bent in the axial direction with the corner part on the axially outer side of the stepped part 54 as a boundary in a state of being caught and engaged with the corner part on the axially outer side of the stepped part 54, thereby exhibiting a large prevention force with respect to dislodgment of the retainer 50 outward in the axial direction. Although the stepped part 54 is effective for improving the prevention force with respect to dislodgment of the retainer 50 or the like, the stepped part 54 is not essential in the present invention, and the annular projection 12 may project outward in the axial direction from the retainer 50.

On the other hand, the plurality of connecting parts 14 are formed circumferentially between the adjacent ones of the plurality of compressed fixation parts 13 by the compressed fixation parts 13 being formed at the several locations in the circumferential direction in the annular projection 12 by a compression jig described later. In the state where the inner 10 and the retainer 50 are fixed by the compressed fixation parts 13, the connecting parts 14 are disposed so as to be remote radially inward from the straight part 53 constituting the inner circumferential surface 52 of the retainer 50, and there is a gap 40 between the straight part 53 and each connecting part 14. Whereas the connecting parts 14 may also be remote from the stepped part 54 constituting the inner circumferential surface 52 of the retainer 50 in the state where the inner 10 and the retainer 50 are fixed by the compressed fixation parts 13, in the present practical embodiment, the connecting parts 14 are compressed against the stepped part 54 to exert an auxiliary fixing force. As shown in FIG. 5, the connecting part 14 is positioned on the radially outer side with respect to the stepped part 54 on the radial inside of the straight part 53, and is locked in the axial direction with respect to the stepped part 54, thereby efficiently exhibiting the auxiliary fixing force. In the present practical embodiment, all the connecting parts 14 are in contact with the inner circumferential surface 52 of the opening 51 of the retainer 50 in the stepped part 54. However, it would also be acceptable that some of the of connecting parts 14 are in contact with the stepped part 54, and the other connecting parts 14 are not in contact with the stepped part 54.

With such a structure, as compared with the case where the burrs are generated when the entire annular projection 12, which is formed on the axial end face 15 of the inner 10 and extends outward in the axial direction, is compressed, the burrs (surpluses) that are inherently generated in the compressed fixation parts 13 flow (deform) to the adjacent connecting parts 14 and are absorbed, so that the generation of burrs can be decreased or prevented. That is, in order not to generate burrs, it is preferable that the gap 40 exists between the outer circumferential surface of each connecting part 14 and the straight part 53 even after the compression fixing. That is, if the gap 40 still exists after the compression fixing, it means that the place for the material that has flowed during the compression fixing is sufficiently obtained, and as a result, the generation of burrs will be suppressed.

As shown in FIGS. 2 and 5, the radial thickness T3 of the connecting part 14 is larger than the radial thickness T2 of the compressed fixation part 13. This is because, at the time of compression fixing, the compressed fixation part 13 is crushed between the retainer 50 and the compression jig (described later) to be thinned, while the connecting part 14 is prevented from being thinned by the forming material extruded from the compressed fixation part 13 or is thickened.

With such a structure, as will be described later, each compressed fixation part 13 is formed by a part of the annular projection 12 of the inner 10 being deformed radially outward by such a compression jig as shown in FIG. 7, and is compressed against the straight part 53 constituting the inner circumferential surface 52 of the retainer 50. Therefore, the thickness T2 of the compressed fixation part 13 becomes slightly thinner than the radial thickness T1 of the annular projection 12 before the compression fixing. Besides, in the compressed fixation part 13, the material corresponding to the thickness that is reduced from the radial thickness T1 of the annular projection 12 before the compression fixing flows (deforms), and the radial thickness T3 of each of the connecting parts 14 becomes larger than the radial thickness T1 of the annular projection 12 before the compression fixing and the radial thickness T2 of the compressed fixation part 13. Thus, the generation of burrs will be decreased or prevented.

In the present practical embodiment, the inner 10 and the retainer 50 are made of a metal material. Conventionally, the inner 10 and the retainer 50 are made of a steel material, but for the purpose of reducing the weight of the vibration damping device 1, the inner 10 is made of an aluminum alloy material, and the retainer 50 is made of a steel material, so that the material hardness of the inner 10 is smaller than that of the retainer 50. In this way, in the case where the material hardness of the inner 10 is smaller than that of the retainer 50, when compression is performed over the entire circumference as in the conventional technique, the compression jig scrapes the inner circumferential surface 18 of the inner 10 before the compressed fixation parts 13, which are the compressed portions of the inner 10, deform radially outward, whereby a problem of generating burrs tends to arise.

However, in the present practical embodiment, the annular projection 12 constituting the portion that fixes the inner 10 to the retainer 50 by compression has a structure comprising the plurality of compressed fixation parts 13 arranged in the circumferential direction and the plurality of connecting parts 14 that connect the compressed fixation parts 13 in the circumferential direction. With this configuration, when the inner 10 having the material hardness smaller than that of the retainer 50 is adopted, deformation (escape) of the inner 10 can be controlled while reliably obtaining compression fixing force of the inner 10 and the retainer 50. Accordingly, even when the material hardness of the inner 10 is smaller than that of the retainer 50, generation of burrs can be suppressed in the inner 10 having the small material hardness.

In this way, with the vibration damping device 1 according to the present practical embodiment, in the compressed fixation parts 13, the scrape of the inner circumferential surface 18 of the inner 10 by the compression jig is reduced or avoided, and the material flows (deforms) to the connecting part 14 sides adjacent to the compressed fixation parts 13, thereby suppressing the generation of burrs.

Next, a method of manufacturing the vibration damping device 1 will be described with reference to FIGS. 6 to 9 and appropriately with reference to FIGS. 10 to 13.

The method of manufacturing the vibration damping device 1 includes a connection step, an insertion step, and a compression step.

The connection step is a step of forming an intermediary body 2 which is the main body excluding the retainers 50, 60 in the vibration damping device 1. As shown in FIG. 6, the inner 10 and the outer 20 are put in a predetermined mold (not shown) with the outer 20 placed externally about the inner 10. Then, an unvulcanized rubber material is injected between the inner 10 and the outer 20, and the rubber material is vulcanized by a conventionally used predetermined vulcanizer (not shown). In this way, the elastic body 30 is molded between the inner 10 and the outer 20 to form the intermediary body 2.

When the connection step is performed, the elastic body 30 is in a state of being bonded by vulcanization to the outer circumferential surface of the inner 10 and the inner circumferential surface of the outer 20. Since vulcanization bonding is carried out in a heating environment, tensile stress (tensile strain) remains in the elastic body 30 when cooled to room temperature. After the intermediary body 2 is cooled, the intermediary body 2 is attached to a jig for diameter constriction (not shown) to constrict the intermediary body 2 in diameter.

When the intermediary body 2 is constricted in diameter, the residual tensile stress of the elastic body 30 is reduced or removed. In the present practical embodiment, not only the residual tensile stress of the elastic body 30 is removed, but also the compressive stress is applied to the elastic body 30. By so doing, tensile stress acting on the elastic body 30 in a use state is reduced, and durability of the elastic body 30 can be improved.

The insertion step is a step of inserting the annular projections 12 provided to the opposite ends of the inner 10 of the intermediary body 2 into the retainer 50 and the retainer 60. In the manufacture of the vibration damping device 1 according to the present practical embodiment, the retainer 50 and the retainer 60 are fixed to the opposite axial ends of the inner 10. However, the retainer may be fixed only to one end of the inner 10.

Figure 8:
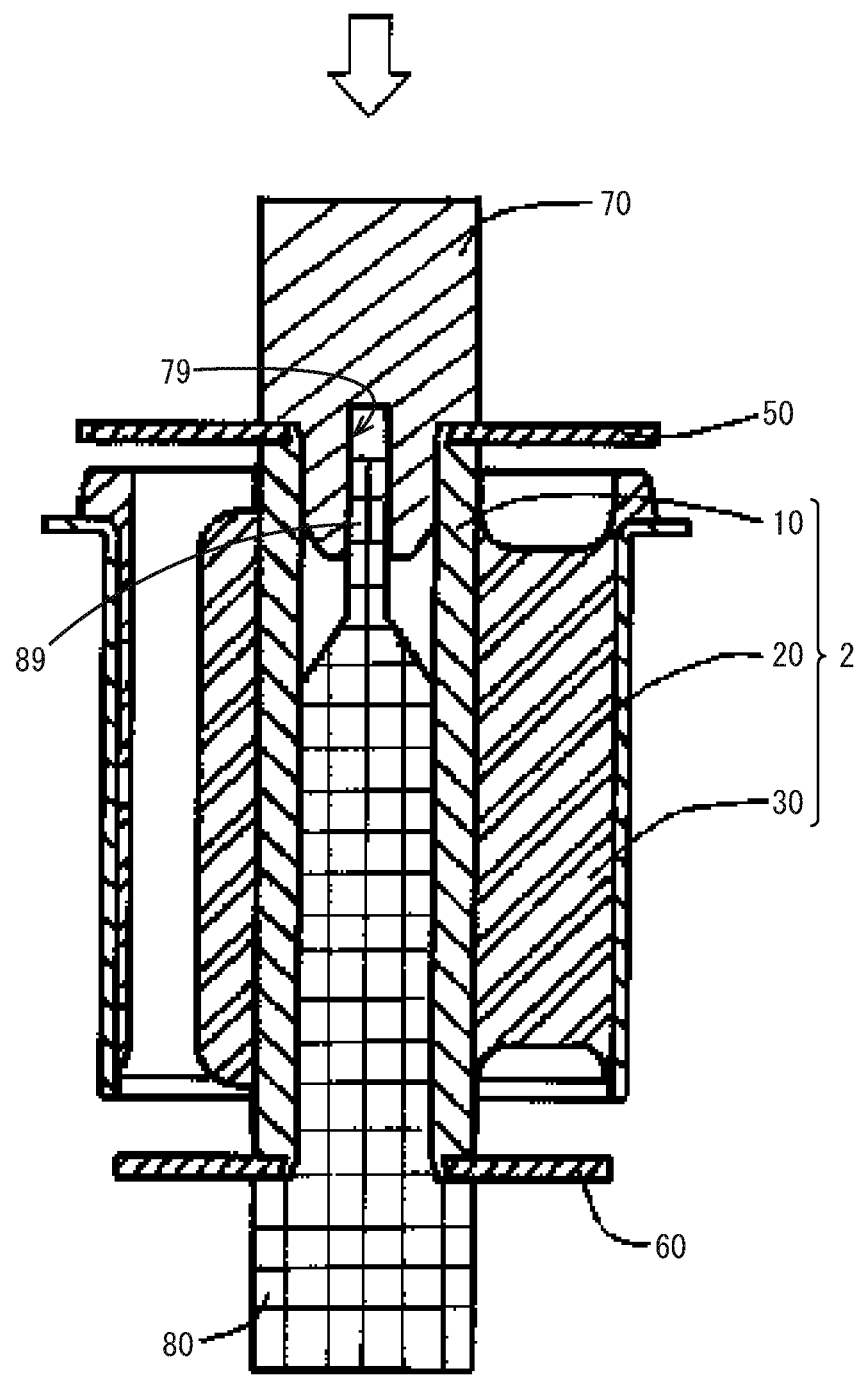
FIG. 8 is a cross-sectional view suitable for explaining a compression step for subjecting the vibration damping device shown in FIG. 1 to the compression fixing.
Figure 9:
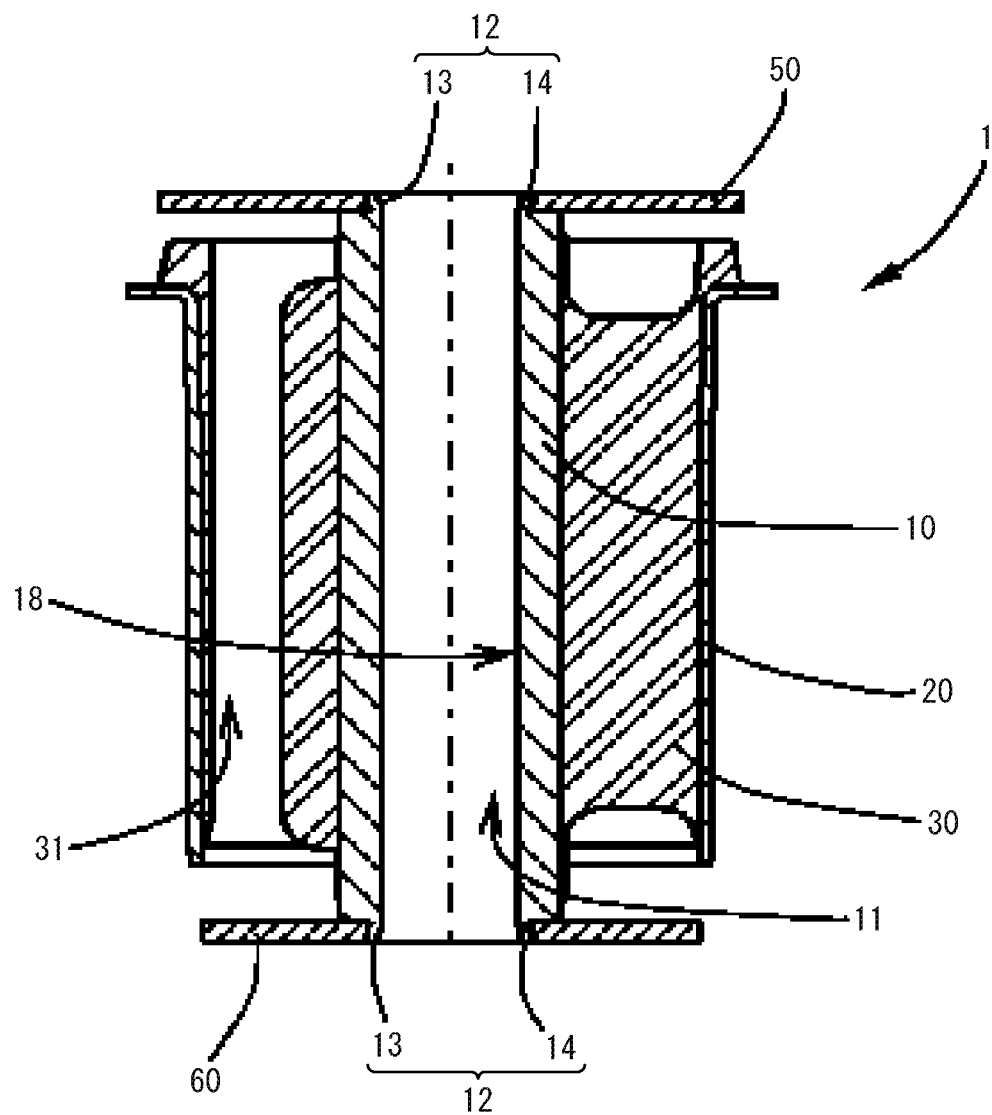
FIG. 9 is a cross-sectional view suitable for explaining a state in which the compression fixing of the vibration damping device shown in FIG. 1 is completed.

In the insertion step, as shown in FIGS. 6, 7, and 8, the annular projections 12, 12 formed at the opposite axial ends of the inner 10 are respectively inserted into the opening 51 of the retainer 50 and the opening 61 of the retainer 60.

Figure 10:
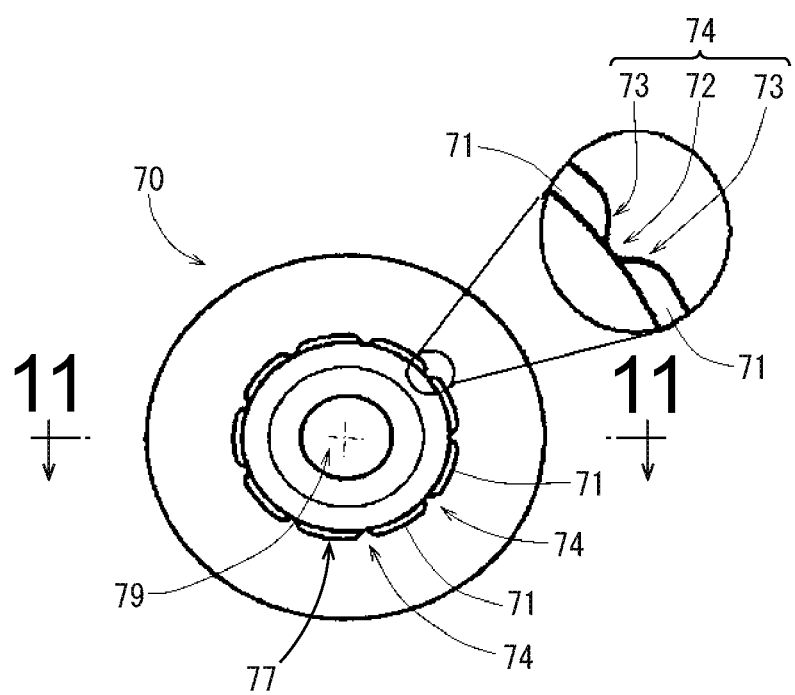
FIG. 10 is a bottom plan view of a first compression fixing jig related to the vibration damping device shown in FIG. 1.
Figure 12:
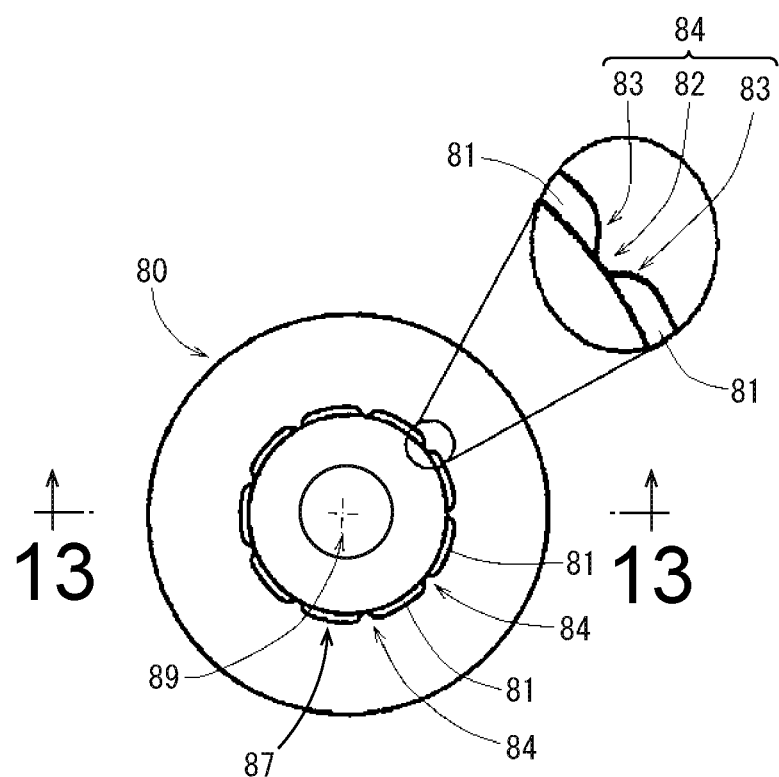
FIG. 12 is a top plan view of a second compression fixing jig related to the vibration damping device shown in FIG. 1.

Specifically, the retainer 60 and the intermediary body 2 are set in this order on a second compression fixing jig 80 serving as a compression jig whose outer circumferential surface includes a plurality of expanded parts 81 that are expanded in the radial direction and are arranged apart from each other in the circumferential direction as shown in FIG. 12, and the lower annular projection 12 of the intermediary body 2 is inserted into the opening 61 of the retainer 60. The upper annular projection 12 of the intermediary body 2 set on the second compression fixing jig 80 is inserted into the opening 51 of the retainer 50, and a first compression fixing jig 70 serving as a compression jig, whose outer circumferential surface includes a plurality of expanded parts 71 that are expanded in the radial direction and are arranged apart from each other in the circumferential direction as shown in FIG. 10, is inserted into the through hole 11 of the inner 10 from the upper side. The arrangement mode of the expanded parts 71, 81 is not particularly limited, but in the present practical embodiment, the expanded parts 71, 81 are arranged at equal intervals in the circumferential direction.

The compression step is a step of fixing the inner 10, the retainer 50, and the retainer 60. In the compression step, as shown in FIG. 8, the first compression fixing jig 70 having an outer circumferential surface of generally round tubular shape, the outer circumferential surface including the plurality of expanded parts 71 that are arranged in the circumferential direction, is lowered to a predetermined position from the upper side, and approaches the second compression fixing jig 80. The predetermined position is a compression position described later.

As shown in FIGS. 7, 8, 11, and 13, an insertion guide part 76 of the first compression fixing jig 70 and an insertion guide part 86 of the second compression fixing jig 80 are inserted into the through hole 11 of the inner 10. The first compression fixing jig 70 and the second compression fixing jig 80 are inserted into the radial insides of the respective annular projections 12, 12 at opposite ends of the inner 10 at the compression position. By so doing, at the opposite ends of the inner 10, the portions of the annular projections 12, 12 at which the plurality of expanded parts 71, 81 of the first and second compression fixing jigs 70, 80 are placed, are compressed against the respective inner circumferential surfaces 52, 62 of the openings 51, 61 of the retainers 50, 60, so as to form the plurality of compressed fixation parts 13 that are arranged apart from each other in the circumferential direction of the annular projections 12, 12 thereby fixing the retainers 50, 60 to the inner 10. Besides, the connecting parts 14 that are circumferentially interposed between adjacent ones of the compressed fixation parts 13 and connect the adjacent ones of the compressed fixation parts 13 in the circumferential direction are formed. The position of the first and second compression fixing jigs 70, 80 shown in FIG. 8 in which the plurality of compressed fixation parts 13 and the plurality of connecting parts 14 are formed on the annular projections 12, 12 on the axially opposite sides by the first and second compression fixing jigs 70, 80 is the compression position. In other words, the compression position is the position of the first and second compression fixing jigs 70, 80 when the first compression fixing jig 70 and the second compression fixing jig 80 are closest to each other in the axial direction in a compression step (described below) for forming the compressed fixation parts 13. Regarding the first and second compression fixing jigs 70, 80 arranged at the compression position, both the insertion guide part 76 of the first compression fixing jig 70 and the insertion guide part 86 of the second compression fixing jig 80 are entirely inserted in the center hole of the inner 10 including the annular projections 12, 12. The first and second compression fixing jigs 70, 80 arranged at the compression position are positioned in the axial direction by coming into contact with at least one of the peripheral edge part of the openings 51, 61 of the retainers 50, 60 and the projecting distal end of the annular projections 12, 12 from the outside in the axial direction.

In the compression step, by using the compression fixing jigs 70, 80 having the outer circumferential surface of generally round tubular shape, the outer circumferential surface including the plurality of expanded parts 71, 81 that are expanded in the radial direction are arranged in the circumferential direction, the generation of burrs can be reduced or avoided when forming the compressed fixation parts 13 and the connecting parts 14, thereby obviating or simplifying the deburring work.

FIG. 10 is a bottom plan view of the first compression fixing jig 70 related to the vibration damping device 1 of FIG. 1. The first compression fixing jig 70 shown in FIG. 10 includes a compression part 77. The compression part 77 includes the plurality of expanded parts 71 arranged in an annular shape, and a plurality of curving face connecting parts 74 that are circumferentially interposed between adjacent ones of the expanded parts 71 and connect the adjacent ones of the expanded parts 71 in the circumferential direction while being each formed in a shape of curving face that is convex to the radially inner side at the cross section in the axis-perpendicular direction in the portion that is configured to form the compressed fixation parts 13. Each curving face connecting part 74 comprises a radial inside convex part 72 and curving face parts 73 that are positioned on the circumferentially opposite sides of the radial inside convex part 72.

Figure 11:
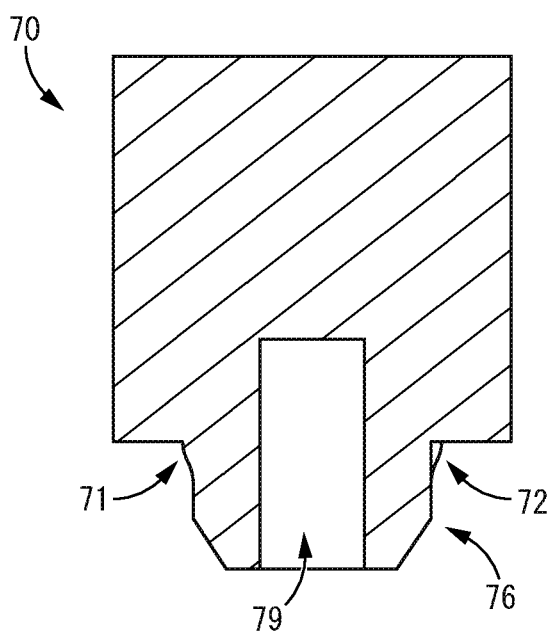
FIG. 11 is a cross-sectional view taken along line 11-11 of FIG. 10.

FIG. 11 is a cross-sectional view taken along line 11-11 of FIG. 10. The first compression fixing jig 70 has the outer circumferential surface of generally round tubular shape extending in the axial direction, and includes the insertion guide part 76 and the compression part 77 on its one end side, the compression part 77 including the expanded parts 71 arranged in an annular shape and the curving face connecting parts 74 that connect the expanded parts 71 in the circumferential direction. The compression part 77 is configured to be located at one of the annular projections 12, 12 provided to the opposite ends of the inner 10 when the first compression fixing jig 70 is inserted into the inner 10 and moved to the compression position.

FIG. 12 is a top plan view of the second compression fixing jig 80 related to the vibration damping device of FIG. 1. The second compression fixing jig 80 shown in FIG. 12 includes a compression part 87. The compression part 87 includes the plurality of expanded parts 81 arranged in an annular shape, and a plurality of curving face connecting parts 84 that are circumferentially interposed between adjacent ones of the expanded parts 81 and connect the adjacent ones of the expanded parts 81 in the circumferential direction while being each formed in a shape of curving face that is convex to the radially inner side at the cross section in the axis-perpendicular direction in the portion that is configured to form the compressed fixation parts 13. Each curving face connecting part 84 comprises a radial inside convex part 82 and curving face parts 83 that are positioned on the circumferentially opposite sides of the radial inside convex part 82.

Figure 13:
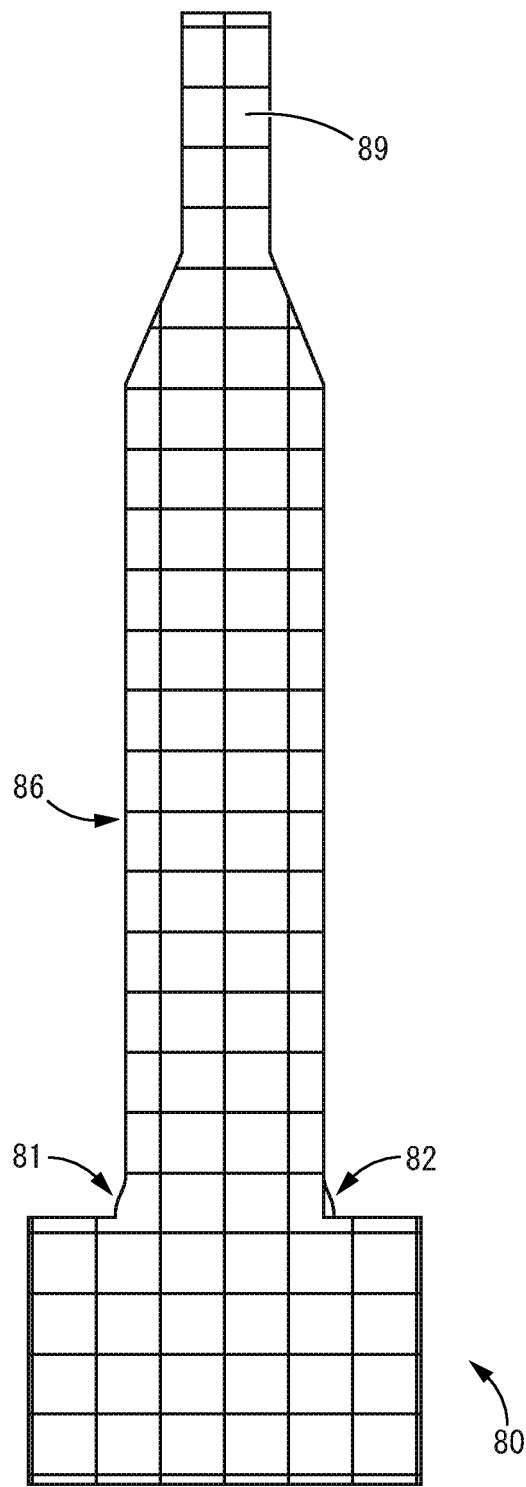
FIG. 13 is a cross-sectional view taken along line 13-13 of FIG. 12.

FIG. 13 is a cross-sectional view taken along line 13-13 of FIG. 12. The second compression fixing jig 80 has the outer circumferential surface of generally round tubular shape extending in the axial direction, and includes the insertion guide part 86 and the compression part 87 on its one end side, the compression part 87 including the expanded parts 81 arranged in an annular shape and the curving face connecting parts 84 that connect the expanded parts 81 in the circumferential direction. The compression part 87 is configured to be located at the other of the annular projections 12, 12 provided to the opposite ends of the inner 10 when the first compression fixing jig 70 is inserted into the inner 10 and moved to the compression position.

Regarding the coupling state of the first compression fixing jig 70 and the second compression fixing jig 80, as shown in FIGS. 8, 11, and 13, the first compression fixing jig 70 includes an insertion hole 79 extending in the axial direction from the end face on the insertion distal end side into the inner 10 (the lower side). The second compression fixing jig 80 includes an insertion part 89 to be inserted into the insertion hole 79 of the first compression fixing jig 70. By inserting the insertion part 89 into the insertion hole 79, the first compression fixing jig 70 and the second compression fixing jig 80 are relatively positioned, so that the position of compression fixing is determined. In the present practical embodiment, the insertion part 89 is inserted into the insertion hole 79, and the first compression fixing jig 70 is overlapped from above with the retainer 50 in the axial direction, while the second compression fixing jig 80 is overlapped from below with the retainer 60 in the axial direction, so that the first compression fixing jig 70 and the second compression fixing jig 80 are relatively positioned in the axial direction. Besides, in the present practical embodiment, the insertion guide part 76 of the first compression fixing jig 70 and the insertion guide part 86 of the second compression fixing jig 80 are inserted into the through hole 11 of the inner 10 from the axially opposite sides, and the insertion part 89 is inserted into the insertion hole 79, so that the first compression fixing jig 70 and the second compression fixing jig 80 are relatively positioned in the radial direction. By inserting the insertion part 89 into the insertion hole 79, even if either one of the insertion guide part 76 of the first compression fixing jig 70 and the insertion guide part 86 of the second compression fixing jig 80 is made smaller in diameter than the inner diameter of the through hole 11 of the inner 10 and is remote from the inner circumferential surface of the inner 10, the first compression fixing jig 70 and the second compression fixing jig 80 are relatively positioned in the radial direction at the compression position. However, the insertion hole 79 and the insertion part 89 are not essential, but for example, the first compression fixing jig 70 and the second compression fixing jig 80 may be positioned in the axial direction or in the radial direction via the intermediary body 2.

When performing compression fixing of the retainers 50, 60 and the inner 10 by using the compression fixing jigs having such structures, the plurality of compressed fixation parts 13 are formed at the positions apart from each other in the circumferential direction via the connecting parts 14, so that the generation of burrs is reduced or avoided, thereby obviating or simplifying the deburring work.

Figure 14:
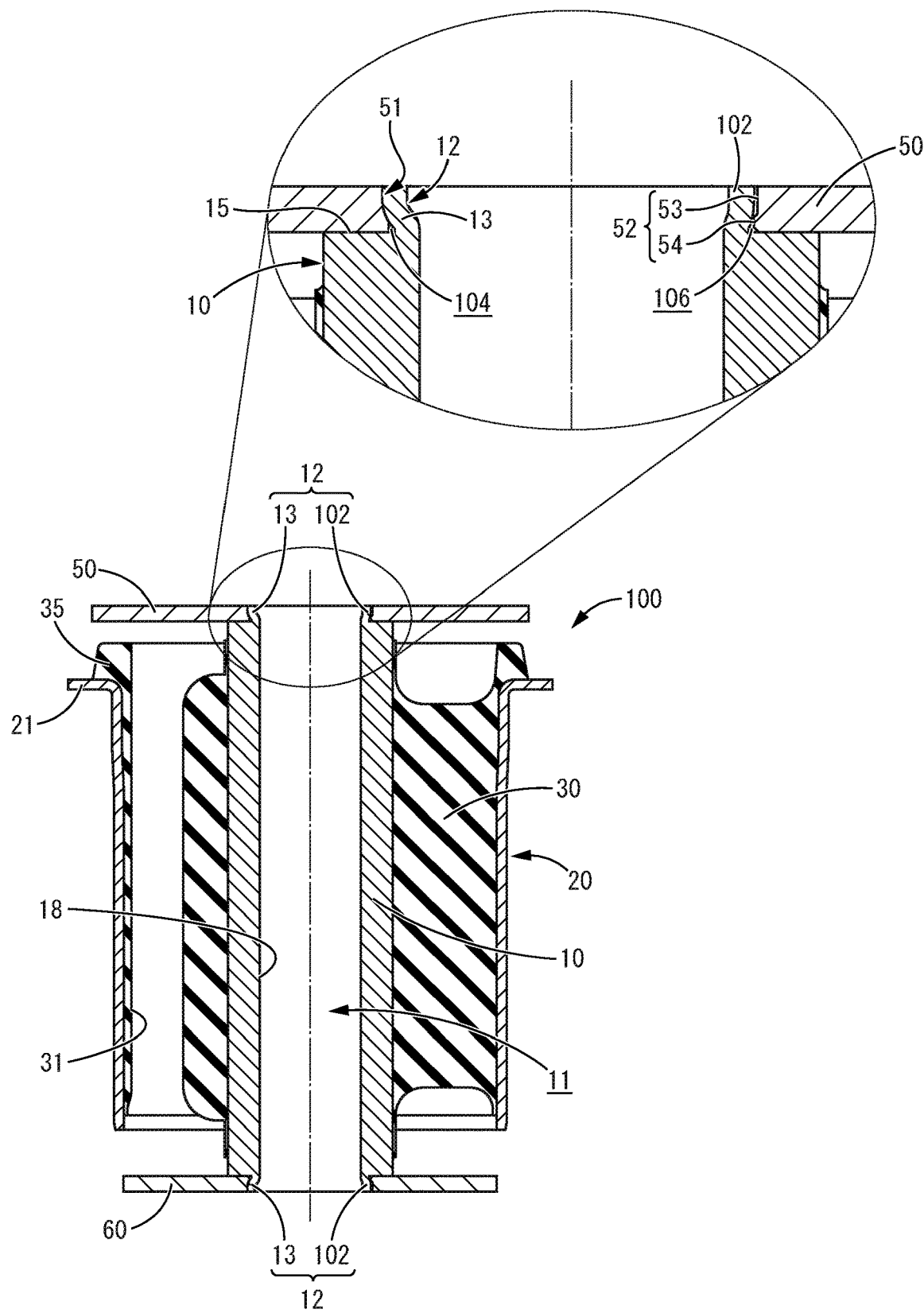
FIG. 14 is a vertical cross-sectional view showing a vibration damping device according to another practical embodiment of the present invention.

FIG. 14 depicts a vibration damping device 100 according to another practical embodiment of the present invention. In the following description, components and parts that are substantially identical with those in the preceding first practical embodiment will be assigned like symbols and not described in any detail. Also, similarly to the preceding practical embodiment, since the retainer 50 and the retainer 60 have generally the same structures, description of the retainer 60 is omitted by describing the retainer 50.

The vibration damping device 100 is provided with the annular projection 12 that projects from the axial end face of the inner 10. The plurality of compressed fixation parts 13 of the annular projection 12 are compressed against the inner circumferential surface 52 of the opening 51 of the retainer 50, and connecting parts 102 are provided circumferentially between the adjacent ones of the compressed fixation parts 13. The compressed fixation part 13 is pushed to expand to the outer periphery and compressed against the inner circumferential surface 52 of the opening 51 of the retainer 50 so as to be fixed by compression to the retainer 50, whereby the retainer 50 is fixed to the inner 10. The compressed fixation part 13 is compressed against the straight part 53 and is remote from the radially inner side face of the stepped part 54, and a gap 104 is formed between the compressed fixation part 13 and the stepped part 54. Besides, the compressed fixation part 13 is locked with respect to the stepped part 54 in the axial direction. In the state where the retainer 50 is fixed to the inner 10, the connecting part 102 is remote from the inner circumferential surface 52 of the opening 51 of the retainer 50 even at the stepped part 54, and a gap 106 is formed between the entire connecting part 102 and the inner circumferential surface 52 of the opening 51 of the retainer 50.

The same effect as that in the preceding first practical embodiment can be obtained by the vibration damping device 100 constructed according to the present practical embodiment as well. Besides, the gap 106 is provided across the entire length in the axial direction between the inner circumferential surface 52 of the opening 51 of the retainer 50 and the connecting part 102. Thus, swelling deformation in the circumferential direction due to compressive deformation in the radial direction of the compressed fixation part 13 is effectively permitted by the gap 106, and the generation of burrs when the compressed fixation part 13 is expanded by the compression fixing jig (not shown) will be suppressed. Additionally, since the gap 104 is formed between the compressed fixation part 13 and the stepped part 54, the generation of burrs on the inner circumferential surface of the compressed fixation part 13 will be more effectively suppressed.

Although various practical embodiments of the present invention have been described above, the configurations and combinations thereof in those practical embodiments are merely examples, and the configurations may be added, omitted, or replaced, and other changes are possible without departing from the spirit and scope of the invention. Furthermore, the invention shall not be limited to the practical embodiments.

For example, in the preceding practical embodiment, the plurality of compressed fixation parts 13 having the same shape and size are arranged in the circumferential direction, but the plurality of compressed fixation parts 13 may be mutually different in shape, circumferential length, and the like. More specifically, for example, a first compressed fixation part having a long circumferential length and a second compressed fixation part having a short circumferential length may be alternately arranged in the circumferential direction, or the like.

In the preceding practical embodiment, the plurality of connecting parts 14 having the same shape and size are arranged in the circumferential direction, but the plurality of connecting parts 14 may be mutually different in shape, circumferential length, and the like.

In the preceding practical embodiment, the circumferential length of the compressed fixation part 13 is larger than the circumferential length of the connecting part 14. However, for example, the compressed fixation part 13 and the connecting part 14 may have the same length in the circumferential direction, or the connecting part 14 may be larger in circumferential length than the compressed fixation part 13.

The annular projection 12 does not necessarily need to be a straight round tubular shape, but for example, a portion where the compressed fixation part 13 is configured to be formed may be made larger in diameter than a portion where the connecting part 14 is configured to be formed, in a state before compression.

The preceding practical embodiment illustrated the structure in which the inner circumferential surface 52 of the opening 51 of the retainer 50 includes the straight part 53 and the stepped part 54, and the stepped part 54 projects radially inward. However, the inner circumferential surface 52 of the opening 51 of the retainer 50 may be, for example, a straight tubular surface, or a tapered surface expanding toward the axially outer side, or may include a plurality of stepped parts (projections). The stepped part need not be continuous over the entire circumference, but may be provided, for example, intermittently in the circumferential direction, or the like. Besides, in addition to or instead of providing the stepped part 54, the opening end on the axially outer side of the opening 51 of the retainer 50 may be expanded in a tapered shape or a chamfered shape, or the like, and the compressed fixation part 13 of the distal end of the annular projection 12 may be engaged with the said opening end.

The first practical embodiment disclosed the mode in which the connecting part 14 is in contact with the inner circumferential surface 52 of the opening 51 of the retainer 50 at the stepped part 54 and is remote therefrom at the straight part 53. Meanwhile, the preceding another practical embodiment disclosed the mode in which the connecting part 102 is remote from the inner circumferential surface 52 of the opening 51 of the retainer 50 across the entire length. However, for example, the contact mode of the connecting part with respect to the inner circumferential surface of the opening of the retainer shall not be limitedly interpreted by the preceding practical embodiments. Hereinafter, for ease of understanding, description will be given by appropriately citing the reference numerals of the preceding practical embodiments.

Figure 15:
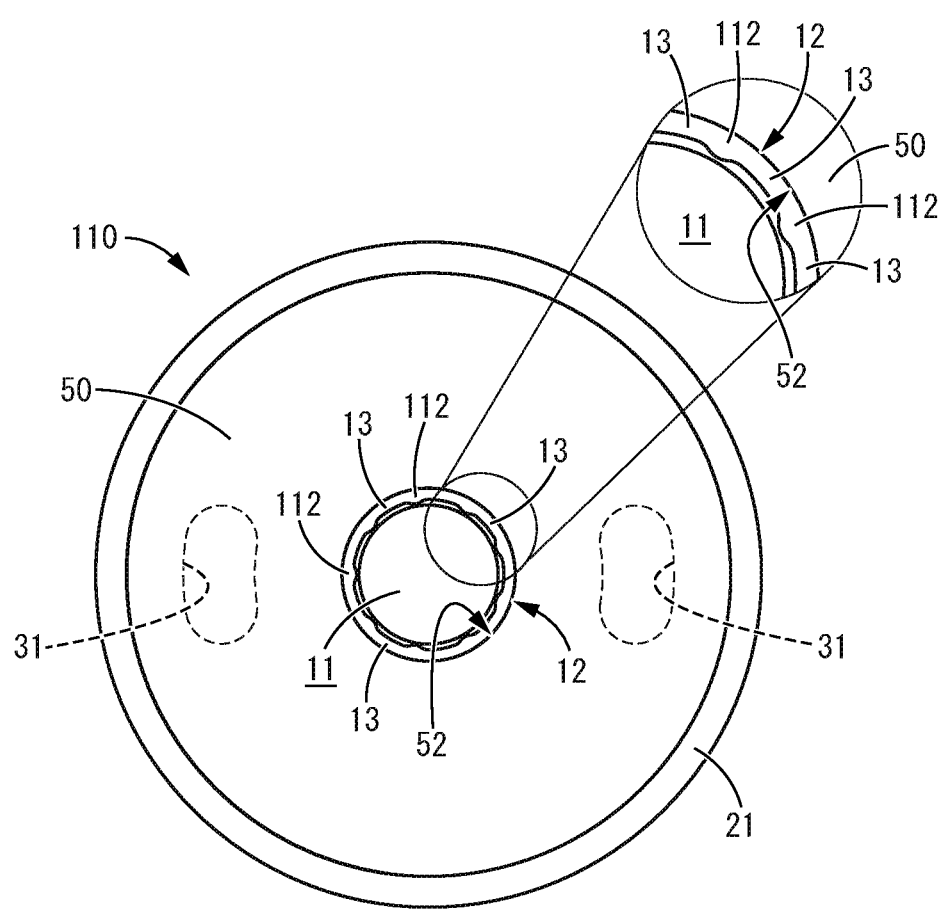
FIG. 15 is a top plan view showing a vibration damping device according to yet another practical embodiment of the present invention.

For example, like a vibration damping device 110 shown in FIG. 15, connecting parts 112 may be in contact with the inner circumferential surface 52 of the opening 51 of the retainer 50 at both the stepped part 54 and the straight part 53. Each connecting part 112 is not pushed to expand to the outer periphery as positively as the compressed fixation part 13 is. For example, by the compressed fixation part 13 extending to the circumferentially opposite sides due to being compressed in the radial direction, the connecting part 112 is thickened, and the gap between the inner circumferential surface 52 of the opening 51 of the retainer 50 and the connecting part 112 is substantially filled, whereby the connecting part 112 comes into contact with the inner circumferential surface 52 of the opening 51 of the retainer 50 including the straight part 53. Accordingly, for example, the connecting part 112 is in contact with the inner circumferential surface 52 of the opening 51 of the retainer 50 with a contact pressure smaller than that of the compressed fixation part 13, while having a thickness dimension in the radial direction larger than that of the compressed fixation part 13, and can be formed into a shape that projects to the radial inside further than the compressed fixation part 13. In this way, if the connecting part 112 is in contact with the inner circumferential surface 52 of the opening 51 of the retainer 50 across the entire length in the axial direction, the gap between the retainer 50 and the connecting part 112 is reduced or prevented from being generated, and entry of debris into the gap is easily prevented. The connecting part may be in contact with the inner circumferential surface 52 of the retainer 50 at the straight part 53, and may be remote radially inward therefrom at the stepped part 54.

The preceding first practical embodiment described that the thicknesses are preferably configured to meet T2<T1<T3. However, it is not necessary that the thickness of each portion is constant in the circumferential direction. It is preferable to meet T2<T1<T3 with T1 and T2 each representing the minimum thickness dimension of the corresponding portion while T3 representing the maximum thickness dimension of the corresponding portion. In the said first practical embodiment, the annular projection 12 is formed to have a generally constant thickness dimension in its entirety before compression fixing, but the initial thicknesses of individual parts of the annular projection 12 may be mutually different. Moreover, as in the said first practical embodiment, when the plurality of compressed fixation parts 13 are provided in the circumferential direction with respect to the annular projection 12 of generally round tubular shape, it is preferable that when the inner diameter dimension of the compressed fixation part 13 is compared with the inner diameter dimension of the connecting part 14, the inner diameter dimension of the latter (14) is smaller than the inner diameter dimension of the former (13), in addition to or in place of comparing the thickness dimensions of the compressed fixation part 13 and the connecting part 14. Similarly, regarding the outer diameter dimension, it is preferable that the outer diameter dimension of the latter (14) is smaller than the outer diameter dimension of the former (13).

Although it is desirable that the axially distal ends of the compressed fixation part 13 and the connecting part 14 of the annular projection 12 fixed to the inner 10 are aligned over the entire circumference, the axial dimension of the compressed fixation part 13 may be slightly larger than that of the connecting part 14 by allowing the thickness change due to compression process of the compressed fixation part 13 to escape in the axial direction as well.

What is claimed is:

1. A vibration damping device comprising:
   an inner;
   an outer having a tubular shape and disposed on a radially outer side of the inner;
   an elastic body connecting the inner and the outer; and
   a retainer disposed on at least one axial end of the inner and penetrated by an opening in an axial direction, wherein
   the inner includes an annular projection extending outward in the axial direction from at least one axial end face of the inner and inserted in the opening of the retainer,
   the annular projection includes a plurality of compressed fixation parts arranged apart from each other in a circumferential direction, and
   the retainer is fixed to the inner with the plurality of compressed fixation parts being compressed against an inner circumferential surface of the opening of the retainer.

2. The vibration damping device according to claim 1, wherein
   the annular projection includes a plurality of connecting parts that are circumferentially interposed between adjacent ones of the compressed fixation parts and connect the adjacent ones of the compressed fixation parts in the circumferential direction, and
   the retainer is fixed to the inner with a gap formed between each connecting part and the inner circumferential surface of the opening.

3. The vibration damping device according to claim 1, wherein
   the annular projection includes a plurality of connecting parts that are circumferentially interposed between adjacent ones of the compressed fixation parts and connect the adjacent ones of the compressed fixation parts in the circumferential direction, and
   the retainer is fixed to the inner with the connecting parts being in contact with the inner circumferential surface of the opening.

4. The vibration damping device according to claim 2, wherein a radial thickness of each connecting part is larger than that of each compressed fixation part.

5. The vibration damping device according to claim 2, wherein a circumferential length of each compressed fixation part is larger than that of each connecting part.

6. The vibration damping device according to claim 1, wherein a material hardness of the inner is smaller than that of the retainer.

7. The vibration damping device according to claim 1, wherein the compressed fixation parts are arranged at regular intervals in the circumferential direction.

8. The vibration damping device according to claim 1, wherein
the at least one axial end face of the inner is abutted on an opening peripheral edge of the opening of the retainer, while the annular projection projecting from the axial end face of the inner is inserted in the opening of the retainer, and
the inner circumferential surface of the opening of the retainer includes a stepped part projecting radially inward partially on a side on which the inner is abutted, and the compressed fixation parts of the annular projection are locked with respect to the stepped part in the axial direction.

9. The vibration damping device according to claim 8, wherein
the annular projection includes a plurality of connecting parts that are circumferentially interposed between adjacent ones of the compressed fixation parts and connect the adjacent ones of the compressed fixation parts in the circumferential direction, and
the connecting parts are in contact with the inner circumferential surface of the opening at the stepped part of the retainer, while being remote from the inner circumferential surface of the opening with a gap in between at a portion away from the stepped part of the retainer.

10. A method of manufacturing a vibration damping device that comprises an inner including an annular projection extending outward in an axial direction from at least one axial end face of the inner, an outer having a tubular shape and disposed on a radially outer side of the inner, an elastic body connecting an inner circumferential surface of the outer and an outer circumferential surface of the inner, and a retainer disposed on at least one axial end of the inner and penetrated by an opening in the axial direction, the method comprising:
a connection step of forming the elastic body such that the inner and the outer are connected by the elastic body;
an insertion step of inserting the annular projection of the inner into the opening of the retainer; and
a compression step of using a compression jig having an outer circumferential surface of tubular shape, the outer circumferential surface including a plurality of expanded parts that are expanded in a radial direction and arranged apart from each other in a circumferential direction, and inserting the compression jig into a radial inside of the annular projection of the inner such that portions of the annular projection at which the respective expanded parts of the compression jig are placed are compressed against an inner circumferential surface of the opening of the retainer to provide a plurality of compressed fixation parts arranged apart from each other in a circumferential direction of the annular projection and to fix the retainer to the inner.

11. A method of manufacturing a vibration damping device that comprises an inner including an annular projection extending outward in an axial direction from at least one axial end face of the inner, an outer having a tubular shape and disposed on a radially outer side of the inner, an elastic body connecting an inner circumferential surface of the outer and an outer circumferential surface of the inner, and a retainer disposed on at least one axial end of the inner and penetrated by an opening in the axial direction, the method comprising
a compression step of using a compression jig having an outer circumferential surface of tubular shape, the outer circumferential surface including a plurality of expanded parts that are expanded in a radial direction and arranged apart from each other in a circumferential direction, and inserting the compression jig into a radial inside of the annular projection of the inner inserted in the opening of the retainer such that portions of the annular projection at which the respective expanded parts of the compression jig are placed are compressed against an inner circumferential surface of the opening of the retainer to provide a plurality of compressed fixation parts arranged apart from each other in a circumferential direction of the annular projection and to fix the retainer to the inner.

12. The method according to claim 10, wherein the compression jig includes the expanded parts and a plurality of curving face connecting parts that are circumferentially interposed between adjacent ones of the expanded parts and connect the adjacent ones of the expanded parts in the circumferential direction while being each formed in a shape of curving face that is convex to a radially inner side at a cross section in an axis-perpendicular direction in a portion that is configured to form the compressed fixation parts.

13. The method according to claim 11, wherein the compression jig includes the expanded parts and a plurality of curving face connecting parts that are circumferentially interposed between adjacent ones of the expanded parts and connect the adjacent ones of the expanded parts in the circumferential direction while being each formed in a shape of curving face that is convex to a radially inner side at a cross section in an axis-perpendicular direction in a portion that is configured to form the compressed fixation parts.

\* \* \* \* \*